(12) United States Patent
Sakakibara

(10) Patent No.: US 11,668,563 B2
(45) Date of Patent: Jun. 6, 2023

(54) LEVEL

(71) Applicant: WAKO ELECTRIC CO., LTD., Anjo (JP)

(72) Inventor: Yoshiya Sakakibara, Anjo (JP)

(73) Assignee: WAKO ELECTRIC CO., LTD., Anjo (JP)

( * ) Notice: Subject to any disclaimer, the term of this patent is extended or adjusted under 35 U.S.C. 154(b) by 182 days.

(21) Appl. No.: 17/304,178

(22) Filed: Jun. 16, 2021

(65) Prior Publication Data

US 2021/0302159 A1 Sep. 30, 2021

Related U.S. Application Data

(63) Continuation of application No. PCT/JP2019/037172, filed on Sep. 24, 2019.

(30) Foreign Application Priority Data

Dec. 21, 2018 (JP) .............................. JP2018-239368

(51) Int. Cl.
*G01C 9/06* (2006.01)

(52) U.S. Cl.
CPC ......... *G01C 9/06* (2013.01); *G01C 2009/066* (2013.01)

(58) Field of Classification Search
CPC ....... G01C 9/04; G01C 9/06; G01C 2009/066
See application file for complete search history.

(56) References Cited

U.S. PATENT DOCUMENTS

| 4,603,484 A * | 8/1986 | Strothmann | ............. G01C 9/06 33/366.22 |
| 4,912,662 A * | 3/1990 | Butler | ...................... G01C 9/20 33/366.19 |

(Continued)

FOREIGN PATENT DOCUMENTS

| JP | H08-501152 A1 | 2/1996 |
| JP | 2002-048538 A1 | 2/2002 |

(Continued)

OTHER PUBLICATIONS

International Search Report and Written Opinion (Application No. PCT/JP2019/037172) dated Nov. 26, 2019.

(Continued)

*Primary Examiner* — John Fitzgerald
*Assistant Examiner* — Tania Courson
(74) *Attorney, Agent, or Firm* — Burr Patent Law, PLLC

(57) ABSTRACT

A level including a sensor that detects a tilt angle; a display unit including a plurality of strip-shaped display members that linearly emits light by an LED to display the tilt angle; and a controller that receives an output signal from the sensor and outputs a control signal so that a specific strip-shaped display member glows. The strip-shaped display members include one horizontal strip-shaped display member positioned at a middle of the display unit and a plurality of strip-shaped display members for tilt-angle display that has tips bent toward a center of the display unit. LEDs are attached to ends of the strip-shaped display members, respectively, and a pair of strip-shaped display members which is point-symmetrical with respect to the center of the display unit simultaneously glows according to the tilt angle.

6 Claims, 6 Drawing Sheets

(56) References Cited

U.S. PATENT DOCUMENTS

| | | | |
|---|---|---|---|
| 5,313,713 A | | 5/1994 | Heger et al. |
| 5,479,715 A | | 1/1996 | Schultheis et al. |
| 5,488,779 A | | 2/1996 | Schultheis et al. |
| 5,592,745 A | * | 1/1997 | Heger ............... G01C 9/20 33/343 |
| 8,443,524 B2 | * | 5/2013 | Kildevaeld ........... G01C 9/32 33/381 |
| 10,436,584 B2 | * | 10/2019 | Gray ................. G01C 9/26 |
| 11,512,954 B2 | * | 11/2022 | Loebig ............. G01C 15/008 |
| 2006/0064888 A1 | * | 3/2006 | Chen ................. G01C 9/10 33/365 |

FOREIGN PATENT DOCUMENTS

| | | |
|---|---|---|
| JP | 2009-092526 A | 4/2009 |
| JP | 2009-092526 A1 | 4/2009 |
| JP | 2014-055872 A1 | 3/2014 |
| JP | 3214943 U | 2/2018 |
| WO | 94/04888 A1 | 3/1994 |

OTHER PUBLICATIONS

Extended European Search Report, European Application No. 19900569.5, dated Dec. 23, 2021 (7 pages).

* cited by examiner

LEVEL

TECHNICAL FIELD

The present invention relates to a level that can instantly and clearly check a degree of a horizontal state and a tilt state by using a strip-shaped light-emitter that glows linearly.

BACKGROUND ART

Conventionally, in a construction site, a piping site, or the like, a level has been widely used to check a horizontal or vertical state. A conventional level basically has a structure using a bubble tube in which a liquid and a bubble are sealed, and a horizontal state is checked based on whether or not the bubble is located within a predetermined area in the liquid.

However, the conventional level has a problem that it is difficult to immediately confirm the position of the bubble, and also has a problem that the position of the bubble is not seen at all in a dark place. For this reason, many levels have been developed in which the position of a bubble can be confirmed even at night by irradiating the bubble tube with light, as disclosed in Patent Literatures 1 to 3.

However, in the levels disclosed in Patent Literatures 1 and 3, the state is determined by the position of the bubble, and thus, there arises a problem that it is difficult to instantly confirm the position or the position can be confirmed only near the level. On the other hand, as disclosed in Patent Literature 4, a tilt sensor device has been proposed in which multiple line segments are arranged to form a visual display unit and the line segments are displayed according to a tilt. However, it has a problem that it is difficult to instantly recognize the direction and the degree of the tilt.

CITATIONS LIST

Patent Literature

Patent Literature 1: JP 2002-48538 A
Patent Literature 2: JP 2014-55872 A
Patent Literature 3: JP 3214943 U
Patent Literature 4: JP H08-501152 A

SUMMARY OF INVENTION

Technical Problems

An object of the present invention is to solve the conventional problems as described above, and to provide a level with which it is possible to check a degree of a horizontal state or a tilt state instantly and clearly by a strip-shaped light-emitter that glows linearly, and to accurately check a degree of a tilt state even from a distance or even in a dark place.

Solutions to Problems

A level according to the present invention for solving the above problems comprises: a sensor that detects a tilt angle; a display unit including a plurality of strip-shaped display members that emits light linearly by an LED and displays the tilt angle; and a control circuit that receives a signal from the sensor and outputs a control signal so that a specific strip-shaped display member glows.

According to a preferred embodiment, it is preferable that the strip-shaped display members include one horizontal strip-shaped display member positioned at a middle of the display unit and a plurality of strip-shaped display members for tilt-angle display that has tips bent toward a center of the display unit, wherein each of the strip-shaped display members has an LED attached to an end, and a pair of strip-shaped display members provided to be point-symmetrical with respect to the center of the display unit simultaneously glows according to the tilt angle.

In addition, according to another preferred embodiment, it is preferable that LEDs of different colors are attached to the ends of the respective strip-shaped display members.

In addition, according to another preferred embodiment, it is preferable that the level is configured to emit different sounds corresponding to light emissions of the strip-shaped display members.

Advantageous Effects of Invention

In the invention, the level includes: a sensor that detects a tilt angle; a display unit including a plurality of strip-shaped display members that emits light linearly by an LED and displays the tilt angle; and a control circuit that receives a signal from the sensor and outputs a control signal so that a specific strip-shaped display member glows. Therefore, the strip-shaped display members of the display unit emit light linearly according to the tilt angle, and thus, it is possible to instantly check whether or not a horizontal state is established or the tilt angle. In addition, it is possible to accurately check a degree of the tilt state even in a dark place.

In addition, the strip-shaped display members include one horizontal strip-shaped display member positioned at a middle of the display unit and a plurality of strip-shaped display members for tilt-angle display that has tips bent toward a center of the display unit, wherein each of the strip-shaped display members has an LED attached to an end, and a pair of strip-shaped display members provided to be point-symmetrical with respect to the center of the display unit simultaneously glows according to the tilt angle. Thus, the strip-shaped display members emit light linearly according to the tilt angle, whereby it is possible to instantly check whether or not a horizontal state is established, the tilt angle, the tilt direction, or the like.

Further, in the invention, LEDs of different colors are attached to the ends of the respective strip-shaped display members. Thus, it is possible to instantly check whether or not a horizontal state is established, the tilt angle, the tilt direction, or the like by color.

Further, in the invention, the level is configured to emit different sounds corresponding to light emissions of the respective strip-shaped display members, whereby a user can hear a sound according to the tilt angle. Thus, the user can find whether or not a horizontal state is established or the tilt angle without seeing the level.

DESCRIPTION OF EMBODIMENT

A preferred embodiment of the present invention will be described below with reference to the drawings.

Figure 1:
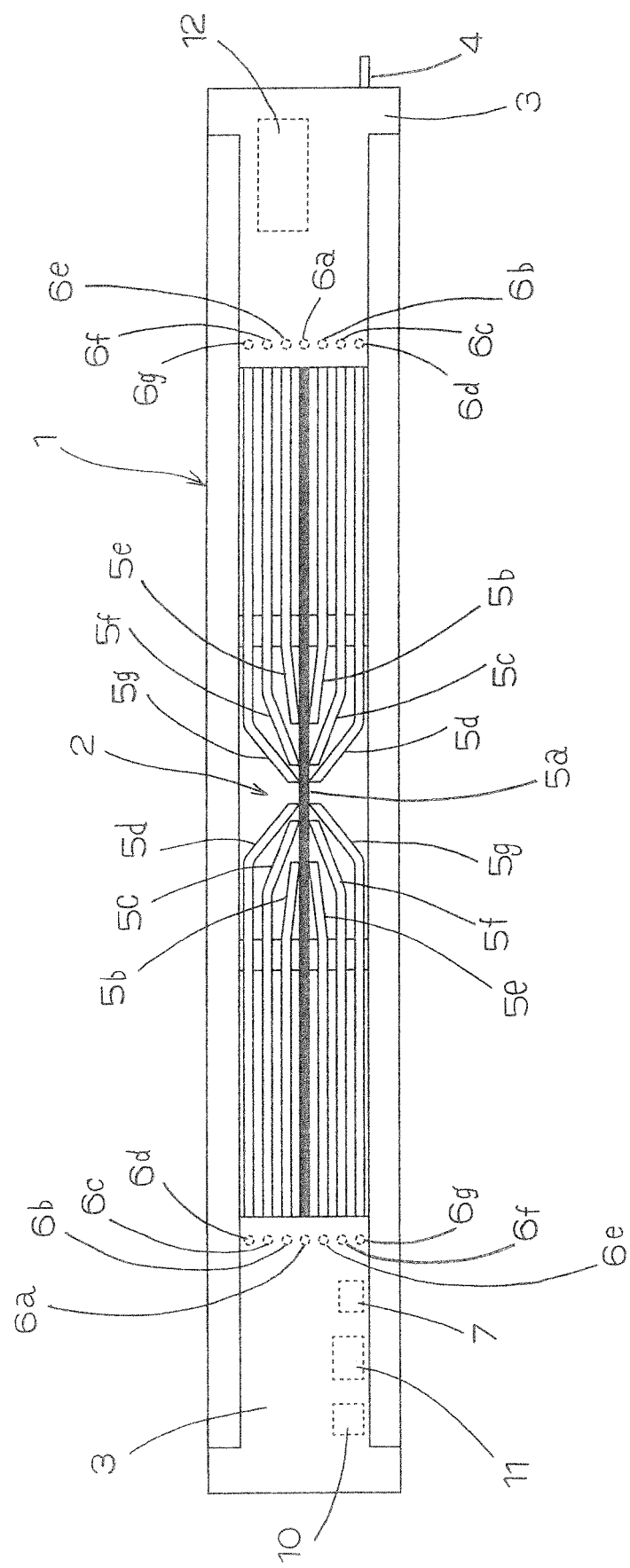
FIG. 1 is a front view illustrating an embodiment of the present invention.
Figure 2:
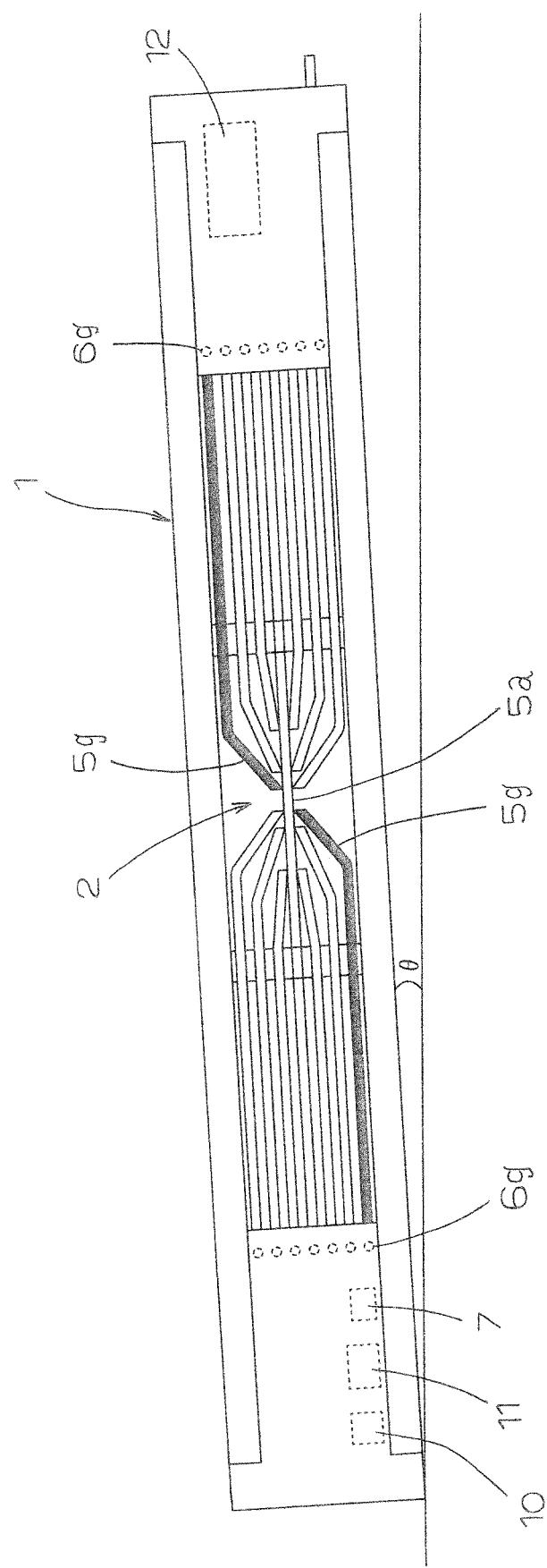
FIG. 2 is a front view illustrating a mode of use in a tilt state.
Figure 3:
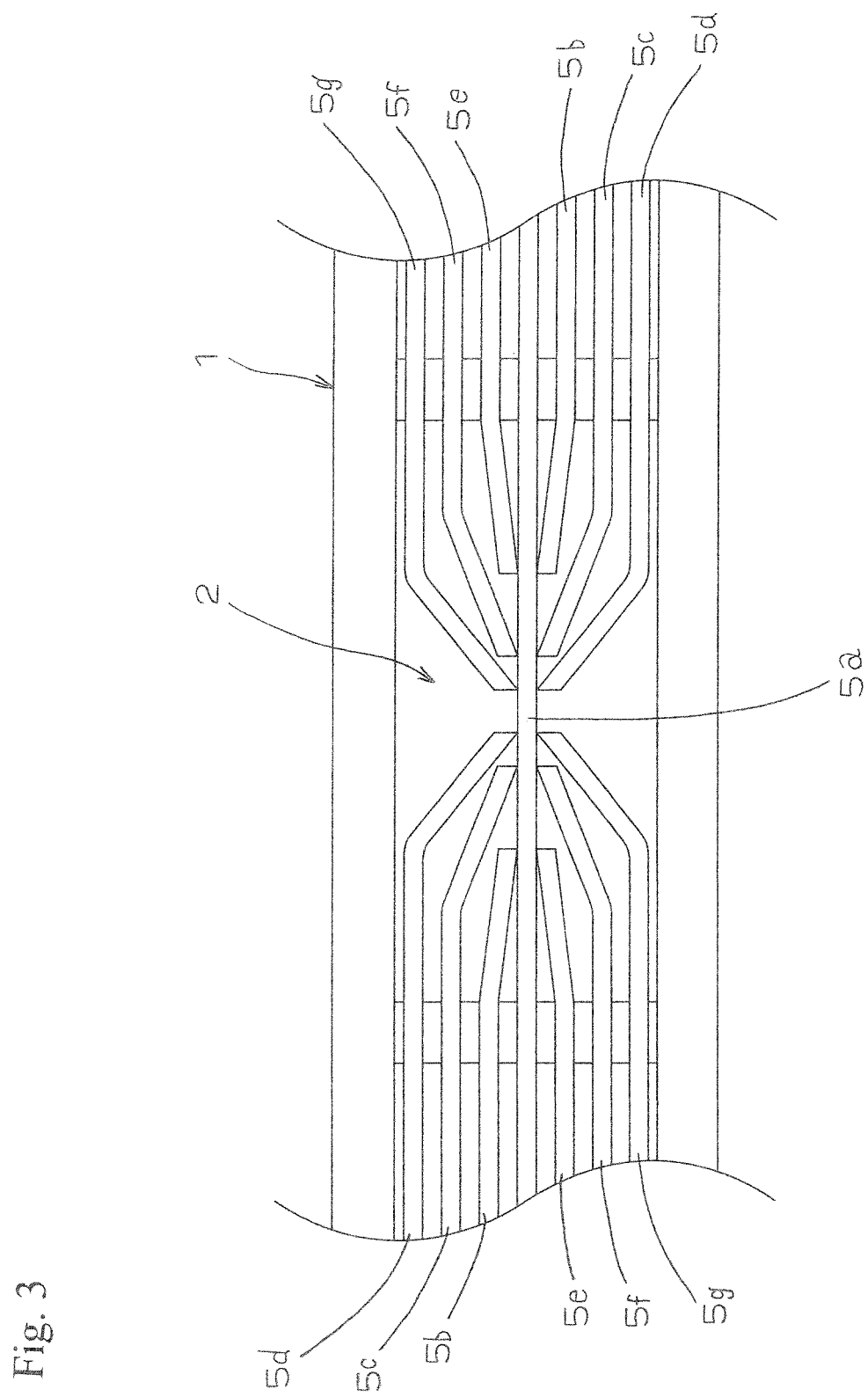
FIG. 3 is an enlarged front view of a main part.
Figure 4:
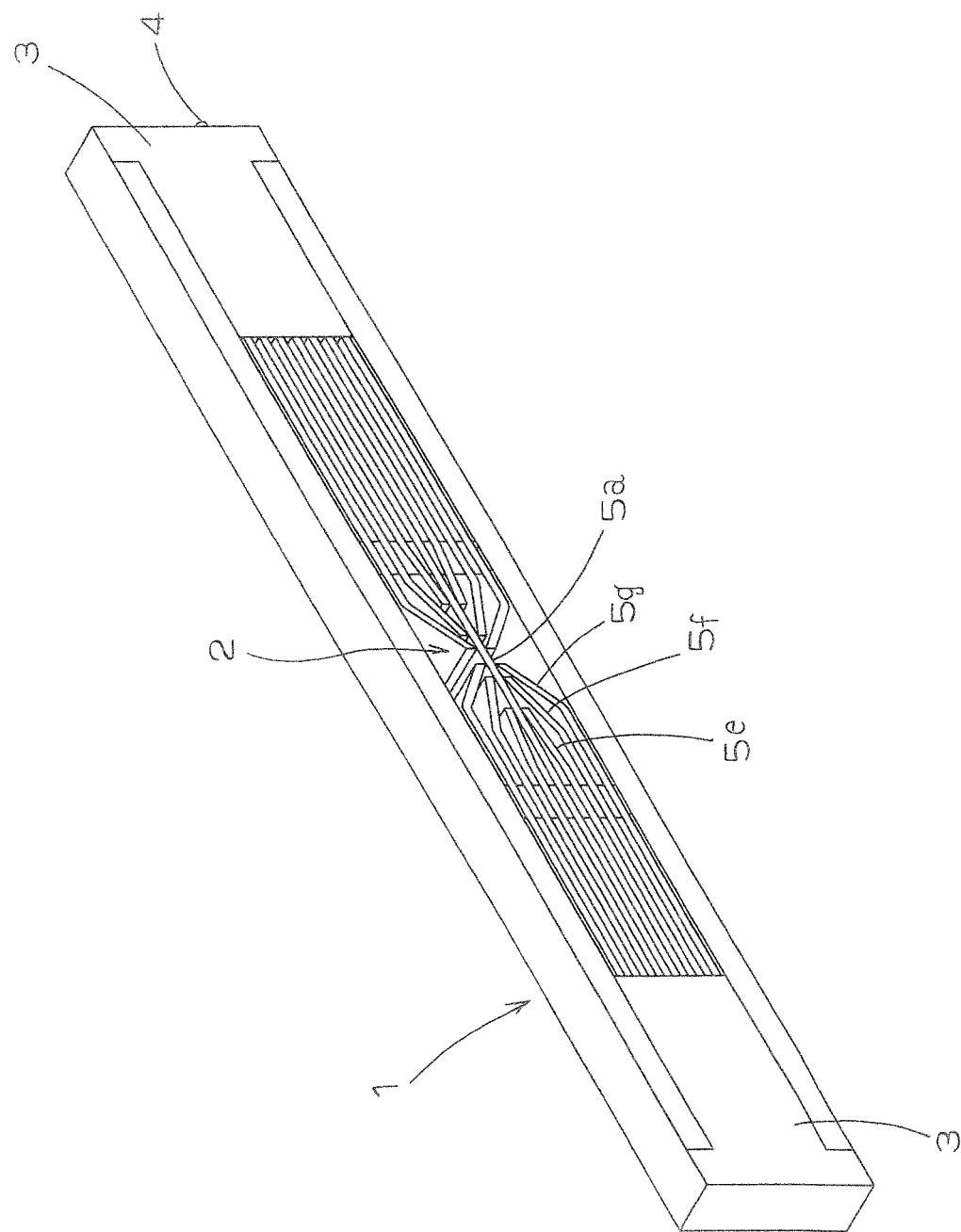
FIG. 4 is a perspective view illustrating the embodiment of the present invention.

FIG. 1 is a front view illustrating a level according to the present invention, FIG. 2 is a front view illustrating a mode of use in a tilt state, FIG. 3 is an enlarged front view of a main part, and FIG. 4 is a perspective view of the level according to the present invention. In the drawings, reference numeral 1 denotes a plate-shaped case body, reference numeral 2 denotes a display unit, reference numeral 3 denotes a cover unit, and reference numeral 4 denotes a switch.

The display unit 2 includes a plurality of strip-shaped display members that emits light linearly by LEDs to display a tilt angle. Each of the strip-shaped display members is made of a transparent synthetic resin plate such as an acrylic plate, and has a structure in which the side surface is treated and formed as frosted glass, so that the entire side surface emits light linearly by the corresponding LED.

In the illustrated level, the strip-shaped display members include one horizontal strip-shaped display member 5a positioned at the middle of the display unit 2 and six strip-shaped display members 5b, 5c, 5d, 5e, 5f, and 5g for tilt-angle display that have tips bent toward the center of the display unit 2. LEDs 6a, 6b, 6c, 6d, 6e, 6f, and 6g are attached to ends of the respective strip-shaped display members.

The horizontal strip-shaped display member 5a is formed of a single horizontal plate and is attached so as to cross the display unit 2. On the other hand, the strip-shaped display members 5b, 5c, 5d, 5e, 5f, and 5g for tilt-angle display are provided such that their tips are bent toward the center of the display unit 2 and terminated near the center as illustrated in FIG. 3.

The strip-shaped display members are configured such that the strip-shaped display member 5a glows linearly in a horizontal state. Further, they are configured as follows. When there is a left upward tilt with an angle of less than 1 degree, the strip-shaped display member 5b glows. When there is a left upward tilt with an angle of 1 degree or more and less than 2 degrees, the strip-shaped display member 5c glows. When there is a left upward tilt with an angle of 2 degrees or more and less than 3 degrees, the strip-shaped display member 5d glows. When there is a left upward tilt with an angle of 3 degrees or more, the strip-shaped display member 5d also blinks.

On the other hand, they are configured as follows. When there is a left downward tilt with an angle of less than 1 degree, the strip-shaped display member 5e glows. When there is a left downward tilt with an angle of 1 degree or more and less than 2 degrees, the strip-shaped display member 5f glows. When there is a left downward tilt with an angle of 2 degrees or more and less than 3 degrees, the strip-shaped display member 5g glows. When there is a left downward tilt with an angle of 3 degrees or more, the strip-shaped display member 5g blinks.

Further, another set of strip-shaped display members which is the same as a set of the strip-shaped display members 5b, 5c, 5d, 5e, 5f, and 5g for tilt-angle display is provided so as to be point-symmetrical with respect to the center of the display unit 2. A pair of strip-shaped display members 5b and 5b for tilt-angle display, a pair of strip-shaped display members 5c and 5c for tilt-angle display, a pair of strip-shaped display members 5d and 5d for tilt-angle display, a pair of strip-shaped display members 5e and 5e for tilt-angle display, a pair of strip-shaped display members 5f and 5f for tilt-angle display, or a pair of strip-shaped display members 5g and 5g for tilt-angle display simultaneously glows in response to each tilt angle.

Therefore, as illustrated in FIG. 2, when there is, for example, a left downward tilt with a tilt angle (8) of 2.5 degrees, the pair of strip-shaped display members 5g and 5g for tilt-angle display glows simultaneously, by which a linear slope continuously extending from the bottom left to the top right of the display unit 2 is displayed. Therefore, it can be instantly confirmed that there is a left downward tilt, and the angle of the tilt is 2 degrees or more and less than 3 degrees. In addition, unlike the conventional level which uses bubbles, a degree of the tilt state can be accurately checked even from a distance or in a dark place. On the other hand, in a horizontal state, the strip-shaped display member 5a glows linearly and horizontally, and thus, the horizontal state can be instantly checked.

The illustrated level includes the horizontal strip-shaped display member 5a and the six strip-shaped display members 5b, 5c, 5d, 5e, 5f, and 5g for tilt-angle display. However, the number of display members may be freely set. In addition, the angles are set in 1-degree increments, such as 1 degree, 2 degrees, and 3 degrees, but the angles can be freely set in smaller increments, greater increments, or the like according to the purpose of use.

In addition, although an LED is indicated as a light source attached to the end of each strip-shaped display member, other devices such as light bulbs can also be used. Further, the LEDs 6a, 6b, 6c, 6d, 6e, 6f, and 6g may have the same color, but if they have different colors, a tilt angle can be recognized by the color of the LED, and thus, convenient. In addition, if, for example, the LEDs 6d and 6g blink in red, a user can recognize danger more instantly, and thus convenient.

In addition, a function of emitting different sounds corresponding to light emissions of the strip-shaped display members can be added. This configuration is convenient, because the tilt state can also be recognized by the type of sound, the intensity of sound, or the like in addition to linear light. In particular, even when the level is set in an out-of-sight place, the tilt state can be recognized through hearing, and thus, work carried out in, for example, a place where a sufficient work space cannot be ensured can be smoothly performed. For example, a sound can be emitted by a speaker 7 attached to a control board as illustrated in FIG. 6.

Next, the operation principle of the level according to the present invention will be briefly described.

As illustrated in FIG. 1, a control board 9 is housed in the case body 1. The control board 9 includes a sensor 10 such as a gyro sensor that detects a tilt angle, and a control circuit 11 that receives a signal from the sensor 10 and outputs a control signal so that a specific strip-shaped display member glows. Reference numeral 12 denotes a power source such as a dry battery.

Figure 6:
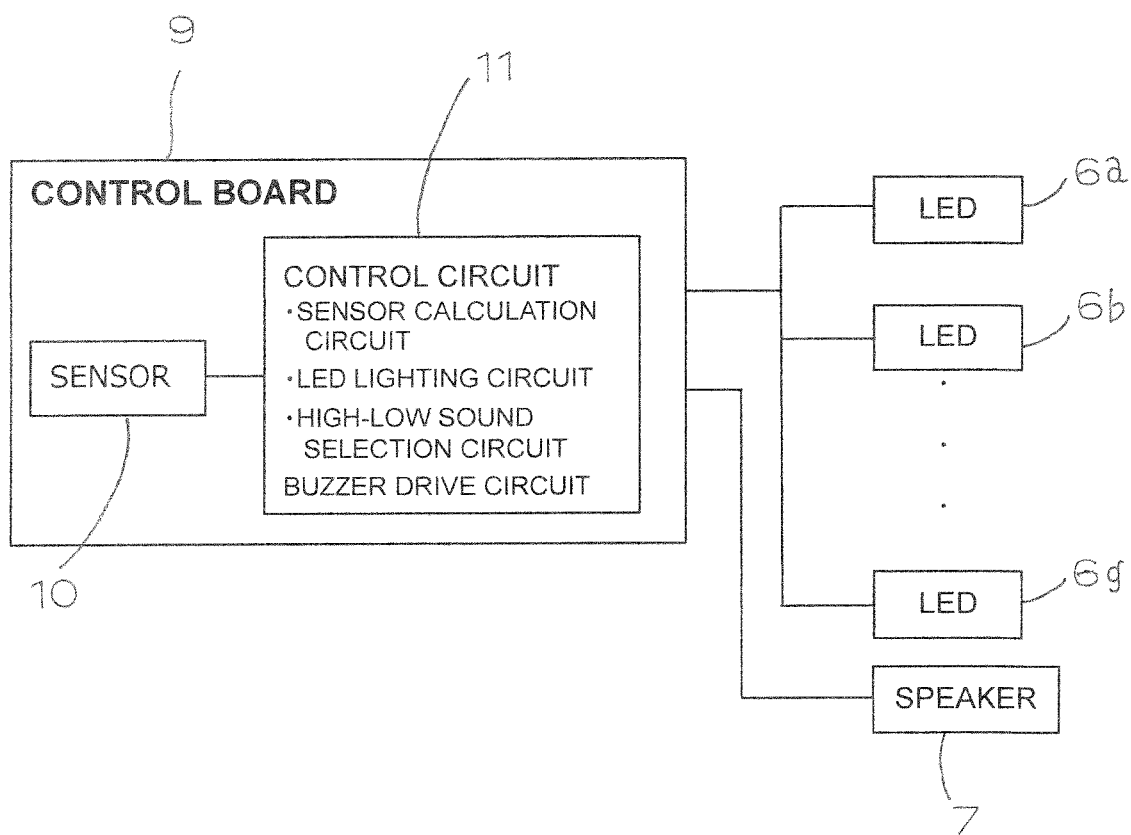
FIG. 6 is a schematic block diagram illustrating an operation principle of the level according to the present invention.

As illustrated in the schematic block diagram illustrating the operation principle of the level in FIG. 6, when a signal from the sensor 10 is input to the control board 9, a signal is emitted by a sensor calculation circuit and an LED lighting circuit in the control circuit 11 so that a specific LED corresponding to the tilt angle emits light. When any one of the LEDs emits light, either the horizontal strip-shaped display member 5a or any one of the strip-shaped display members 5b, 5c, 5d, 5e, 5f, and 5g for tilt-angle display emits light linearly and displays the tilt angle. At this time, since the pair of strip-shaped display members arranged point-symmetrical with respect to the center of the display unit 2 simultaneously glows, the pair of strip-shaped display members linearly emits light according to the tilt angle as if they display the angle. Therefore, it is possible to instantly check whether or not the horizontal state is established, the degree and direction of the tilt, or the like.

Furthermore, if the LEDs have different colors, the tilt angle can be easily recognized by the color of each LED. If the level is configured to emit sound, the tilt state can be recognized also by the type or strength of the sound. Thus, such configurations are convenient.

Figure 5:
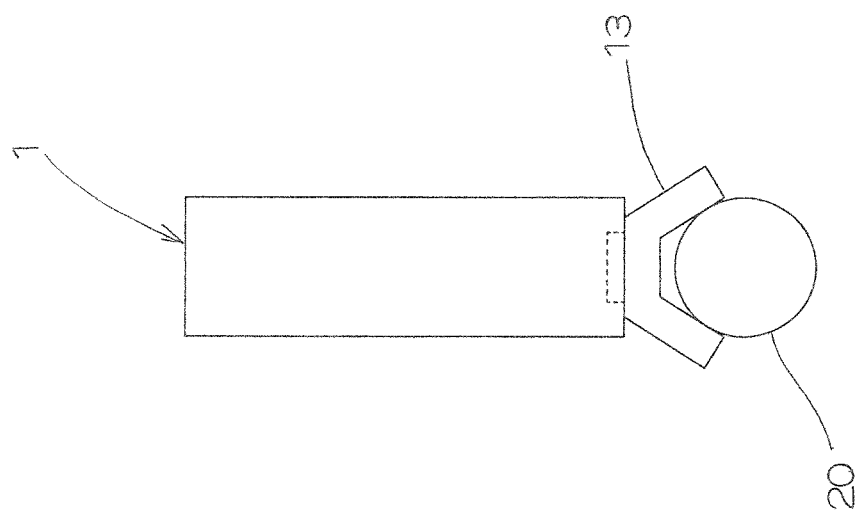
FIG. 5 is a side view illustrating another embodiment.

In piping work and the like, it is necessary to set the level on a pipe having a circular cross section, and the level according to the present invention hardly stands on its own on the pipe. However, when an auxiliary leg 13 having an inverted V shape is used as illustrated in FIG. 5, the level can easily be fixed, and thus convenient.

REFERENCE SIGNS LIST

1 Case body
2 Display unit
3 Cover unit
4 Switch
5a Horizontal strip-shaped display member
5b, 5c, 5d, 5e, 5f, 5g Strip-shaped display member for tilt-angle display
6a, 6b, 6c, 6d, 6e, 6f, 6g LED
7 Speaker
10 Sensor
11 Control circuit
12 Power source
13 Auxiliary leg
20 Piping

The invention claimed is:

1. A level comprising:
   a sensor that detects a tilt angle;
   a display unit including a plurality of strip-shaped display members that emits light linearly by an LED and displays the tilt angle; and
   a control circuit that receives a signal from the sensor and outputs a control signal so that a specific strip-shaped display member glows,
   wherein the strip-shaped display members include one horizontal strip-shaped display member positioned at a middle of the display unit and a plurality of strip-shaped display members for tilt-angle display that has tips bent toward a center of the display unit, wherein each of the strip-shaped display members has an LED attached to an end, and a pair of strip-shaped display members provided to be point-symmetrical with respect to the center of the display unit simultaneously glows according to the tilt angle.

2. The level according to claim 1, wherein the level is configured to emit different sounds corresponding to light emissions of the strip-shaped display members.

3. The level according to claim 1, wherein LEDs of different colors are attached to ends of the respective strip-shaped display members.

4. The level according to claim 1, wherein the level is configured to emit different sounds corresponding to light emissions of the strip-shaped display members.

5. The level according to claim 1, wherein LEDs of different colors are attached to ends of the respective strip-shaped display members.

6. The level according to claim 5, wherein the level is configured to emit different sounds corresponding to light emissions of the strip-shaped display members.

* * * * *